United States Patent
Shanley

(10) Patent No.: US 10,678,735 B2
(45) Date of Patent: Jun. 9, 2020

(54) ASYNCHRONOUS CHANNEL BASED BUS ARCHITECTURE ENABLING DECOUPLED SERVICES

(71) Applicant: VMware, Inc., Palo Alto, CA (US)

(72) Inventor: Dave Shanley, Ashland, VA (US)

(73) Assignee: VMware, Inc., Palo Alto, CA (US)

( * ) Notice: Subject to any disclaimer, the term of this patent is extended or adjusted under 35 U.S.C. 154(b) by 212 days.

(21) Appl. No.: 15/635,043

(22) Filed: Jun. 27, 2017

(65) Prior Publication Data

US 2018/0373661 A1 Dec. 27, 2018

(51) Int. Cl.
*G06F 13/40* (2006.01)
*G06F 9/54* (2006.01)

(52) U.S. Cl.
CPC .......... *G06F 13/4027* (2013.01); *G06F 9/544* (2013.01)

(58) Field of Classification Search
None
See application file for complete search history.

(56) References Cited

U.S. PATENT DOCUMENTS

| | | | |
|---|---|---|---|
| 9,588,503 B2 | 3/2017 | Cooper | |
| 9,693,382 B2 | 6/2017 | Kahn | |
| 9,697,061 B1 | 7/2017 | Lazier | |
| 10,101,734 B2 | 10/2018 | Cooper | |
| 10,133,696 B1 * | 11/2018 | Shanley | G06F 13/4045 |
| 2003/0109271 A1 | 6/2003 | Lewis | |
| 2007/0074227 A1 * | 3/2007 | Naidu | G06F 9/54 |
| | | | 719/330 |
| 2010/0106678 A1 | 4/2010 | Pietrek | |
| 2010/0106812 A1 * | 4/2010 | Bernabeu-Auban | H04L 41/0806 |
| | | | 709/221 |
| 2011/0126213 A1 * | 5/2011 | Macken | G06F 9/54 |
| | | | 719/313 |
| 2012/0023418 A1 | 1/2012 | Frields | |
| 2013/0268437 A1 * | 10/2013 | Desai | G06Q 20/08 |
| | | | 705/41 |
| 2014/0020068 A1 * | 1/2014 | Desai | H04L 63/10 |
| | | | 726/4 |
| 2014/0089113 A1 * | 3/2014 | Desai | G06Q 20/322 |
| | | | 705/16 |
| 2014/0280948 A1 | 9/2014 | Schmidt | |
| 2015/0302398 A1 * | 10/2015 | Desai | G06F 8/60 |
| | | | 705/41 |
| 2017/0220404 A1 | 8/2017 | Seminario | |
| 2017/0371950 A1 | 12/2017 | Perna | |

(Continued)

OTHER PUBLICATIONS

Office Action dated Dec. 13, 2018 for U.S. Appl. No. 15/635,015.

(Continued)

*Primary Examiner* — Henry Tsai
*Assistant Examiner* — Christopher A Bartels
(74) *Attorney, Agent, or Firm* — Clayton, McKay & Bailey, PC

(57) ABSTRACT

In an asynchronous channel based bus architecture enabling decoupled services, there is an asynchronous channel based bus having at least one channel. A first service is coupled to the asynchronous channel based bus, the first service passes messages to and receives messages on the at least one channel. A second service is also coupled to the asynchronous channel based bus, the second service also passes messages to and receive messages on the at least one channel.

18 Claims, 7 Drawing Sheets

(56) References Cited

U.S. PATENT DOCUMENTS

2018/0150487 A1     5/2018  Olivier
2018/0373661 A1*   12/2018  Shanley ................. G06F 9/544
2018/0373663 A1*   12/2018  Shanley ................. G06F 9/544
2018/0373668 A1*   12/2018  Shanley .............. G06F 13/4226

OTHER PUBLICATIONS

Office Action dated May 20, 2019 for U.S. Appl. No. 15/635,015.
Office Action dated Apr. 4, 2019 for U.S. Appl. No. 15/635,073.
Office Action dated Mar. 22, 2019 for U.S. Appl. No. 15/635,043.

* cited by examiner

Background

ASYNCHRONOUS CHANNEL BASED BUS ARCHITECTURE ENABLING DECOUPLED SERVICES

RELATED APPLICATIONS

This application is related to co-pending U.S. application Ser. No. 15/635,015, filed on Jun. 27, 2017, entitled "A Bridge and Asynchronous Channel Based Bus to Provide UI-to-UI Asynchronous Communication," by Dave Shanley, and assigned to the assignee of the present application.

This application is related to co-pending U.S. application Ser. No. 15/635,053, filed on Jun. 27, 2017, entitled "A Bridge, An Asynchronous Channel Based Bus, And A Message Broker To Provide Asynchronous Communication," by Dave Shanley, and assigned to the assignee of the present application.

This application is related to co-pending U.S. application Ser. No. 15/635,073, filed on Jun. 27, 2017, entitled "Schema To Ensure Payload Validity For Communications On An Asynchronous Channel Based Bus," by Dave Shanley, and assigned to the assignee of the present application.

BACKGROUND

Virtual-machine technology essentially abstracts the hardware resources and interfaces of a computer system on behalf of one or multiple virtual machines, each comprising one or more application programs and an operating system. The recent emergence of cloud computing services can provide abstract interfaces to enormous collections of geographically dispersed data centers, allowing computational service providers to develop and deploy complex Internet-based services that execute on tens or hundreds of physical servers through abstract cloud-computing interfaces.

Presently, one challenge when attempting to build separate products or distributed systems, is sourcing, delivering and sharing multiple streams of real-time data between multiple layers of middleware and the services they are serving. Typically developers will employ private API's or SDK's to pull or push data to and from products that talk to one another.

In general, platform to platform communication happens over REST for the most part, some older API's also operate over SOAP. Usually, in order for vProduct X's UI to show information from vProduct Y's data, the X UI has to make a request to the X platform, which in turn will make a request to the Y platform for data and then return that data to the X UI as the response to an XHR request. vProduct Y's UI could in turn do the same in reverse (if they were integrated in a bidirectional manner).

Further, applications typically don't publish these SDK's and API's because they are really only designed for internal use, therefore they are proprietary and quickly become technical debt. API changes often quickly break the UI completely, when there are multiple integrations across a number of products, it becomes a slow, painful and drawn out process to align everyone to the new API changes.

Some modern UI frameworks allow for dependency injection across UI's, and as such, developers create services that are injected into controllers. Services often have other services injected into them also. While this pattern works for smaller applications, it quickly becomes deleteriously unmanageable as the application grows in scope and version. For example, Background FIG. 1 illustrates a present example of services and views that have become tightly coupled and significantly difficult to manage.

Thus, modularity becomes difficult to maintain when tens of services are injected in multiple areas.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

Background

DESCRIPTION OF EMBODIMENTS

Figure 1:
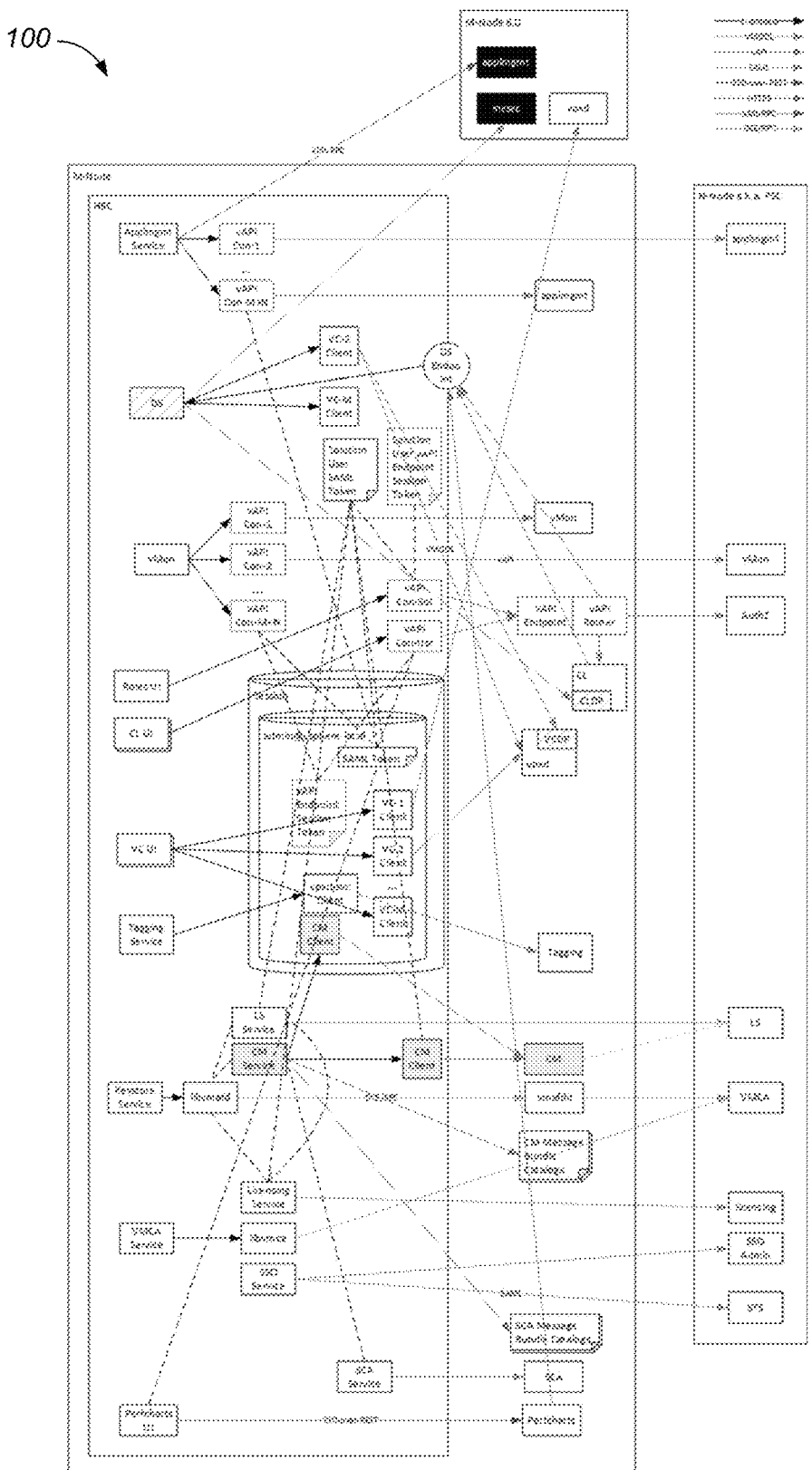
FIG. 1 illustrates an application flow diagram including services and views that have become tightly coupled and significantly difficult to manage.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "connecting," "displaying," "receiving," "providing," "determining," "generating," "establishing," "managing," "extending," "creating," "migrating," "effectuating," or the like, refer to the actions and processes of an electronic computing device or system such as: a host processor, a processor, a memory, a virtual storage area network (VSAN), a virtualization management server or a virtual machine (VM), among others, of a virtualization infrastructure or a computer system of a distributed computing system, or the like, or a combination thereof. It should be appreciated that the virtualization infrastructure may be on-premises (e.g., local) or off-premises (e.g., remote or cloud-based), or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example computer system environment, upon which embodiments of the present invention may be implemented. Example systems having an asynchronous channel based bus architecture enabling decoupled services are then described.

Modern computing can be considered to be a collection of many different levels of abstraction above the physical computing-hardware level that includes physical computer systems, data-storage systems and devices, and communications networks.

The biggest challenge when attempting to build integration between separate products or distributed systems, is sourcing, delivering and sharing multiple streams of real-time data between multiple layers of middleware and the consumers and producers they are serving. Typically, companies such as VMware employ private API's or SDK's to pull or push data to and from products that talk to one another.

Example embodiments described herein provide an asynchronous channel based bus architecture (Bifröst) that enables decoupled services. In one embodiment, Bifröst is a reusable component written in TypeScript. It makes use of technologies such as Simple (or Streaming) Text Orientated Messaging Protocol (STOMP), ReactiveX/Stream based programming, and the like, to build a completely decoupled, fully asynchronous, distributed message bus. The Bifröst allows any UI, service, microservice, or platform to send and receive asynchronous messages between one another all without requiring any additional technology or custom integrations. Existing and legacy applications and middleware written in any language (e.g., Java) can also use the Bifröst architecture to send and receive messages to UI's and/or other services. In one embodiment, the library is delivered by npm and integrates seamlessly into any JavaScript/ Typescript or Angular 4+ based application. In another embodiment, the Bifröst is written in Java and can be used by any Java 8+ application. In both embodiments, the API's match as closely as possible.

In general, STOMP refers to an interoperable wire format used to dramatically simplify the communication between clients and message brokers across a variety of languages, brokers and platforms. It is designed as an alternative to more complex protocols like advanced message queuing protocol (AMQP).

Importantly, the embodiments of the present invention, as will be described below, provide an approach for asynchronous communication which differs significantly from the conventional processes used in API communication. In conventional approaches, API frameworks allow for dependency injection across API's. Normally developers create services that are injected into controllers. Services often have other services injected into them also. Whilst this pattern works for smaller applications, it quickly becomes unmanageable with large applications like the vSphere Webclient. Services and views quickly become tightly coupled and modularity becomes difficult to maintain when tens of services are injected in multiple areas. Such conventional approaches are deleteriously affected by API updates or changes, tedious, time-consuming, and often result in clunky client side code with API work arounds.

Previously, any component that had a high number of service dependencies would normally require a mock for those services when running unit tests.

However, the present embodiments, as will be described and explained below in detail, provide a previously unknown procedure for utilizing an asynchronous channel based bus that enables decoupled services. When using the architecture described herein, test mocks are no longer required. Writing tests with full coverage becomes a much simpler and less time consuming task. That is, when the dependencies between services, controllers and views are reduced down to a single entity, a developer is no longer required to create mocks for previously injected services. Unit tests can truly focus on just testing the logic of the class or component.

The asynchronous channel based bus provides two core services. The first is to allow the dynamic creation and subsequent destruction of channels within the bus. The second is to allow any actor to publish and/or subscribe to those channels and broadcast messages. The bridge is a completely decoupled module that depends only on the bus. Its function is to extend specific channels on the bus out to an application's message broker, platform or designated microservice. These extended channels are referred to herein as Galactic channels.

As will be described in detail, the various embodiments of the present invention do not merely implement conventional API communication processes on a computer. Instead, the various embodiments of the present invention, in part, provide a previously unknown procedure for enabling decoupled services in an application. Hence, embodiments of the present invention provide a novel process for application construction which is necessarily rooted in computer technology to overcome a problem specifically arising in the realm of API communication between separate products or distributed systems.

Example Computer System Environment

Figure 2:
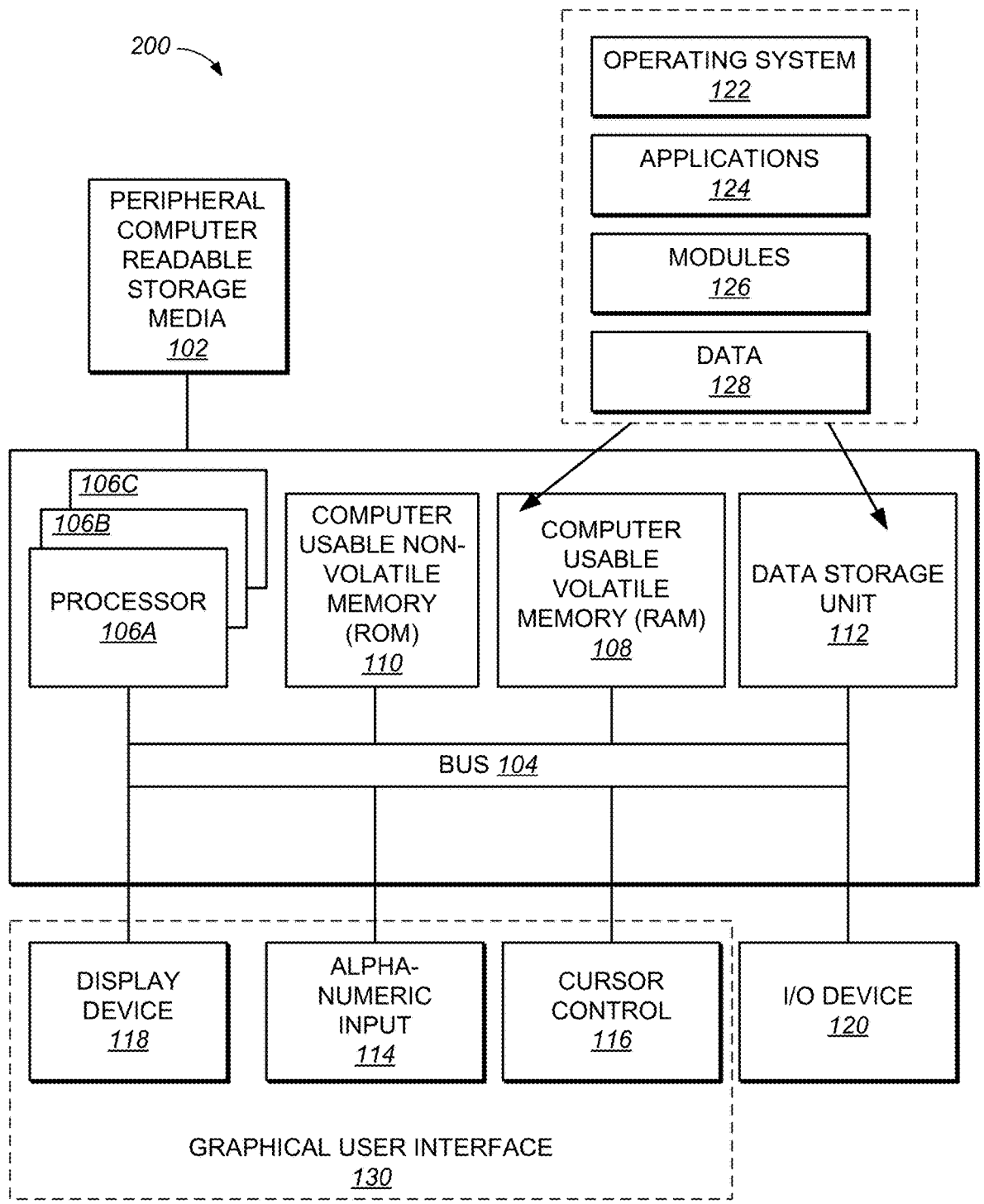
FIG. 2 illustrates an example computer system upon which embodiments of the present invention can be implemented.

With reference now to FIG. 2, all or portions of some embodiments described herein are composed of computer-readable and computer-executable instructions that reside, for example, in computer-usable/computer-readable storage media of a computer system. That is, FIG. 2 illustrates one example of a type of computer (computer system 200) that can be used in accordance with or to implement various embodiments which are discussed herein. It is appreciated that computer system 200 of FIG. 2 is only an example and that embodiments as described herein can operate on or within a number of different computer systems including, but not limited to, general purpose networked computer systems, embedded computer systems, routers, switches, server devices, client devices, various intermediate devices/ nodes, stand alone computer systems, media centers, hand-held computer systems, multi-media devices, virtual machines, virtualization management servers, and the like. Computer system 200 of FIG. 2 is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

System 200 of FIG. 2 includes an address/data bus 104 for communicating information, and a processor 106A coupled with bus 104 for processing information and instructions. As depicted in FIG. 2, system 200 is also well suited to a multi-processor environment in which a plurality of processors 106A, 106B, and 106C are present. Conversely, system 200 is also well suited to having a single processor such as, for example, processor 106A. Processors 106A, 106B, and 106C may be any of various types of microprocessors. System 200 also includes data storage features such as a computer usable volatile memory 108, e.g., random access memory (RAM), coupled with bus 104 for storing information and instructions for processors 106A, 106B, and 106C. System 200 also includes computer usable non-volatile memory 110, e.g., read only memory (ROM), coupled with bus 104 for storing static information and instructions for processors 106A, 106B, and 106C. Also present in system 200 is a data storage unit 112 (e.g., a magnetic or optical disc and disc drive) coupled with bus 104 for storing information and instructions. System 200 also includes an alphanumeric input device 114 including alphanumeric and function keys coupled with bus 104 for communicating information and command selections to processor 106A or processors 106A, 106B, and 106C. System 200 also includes an cursor control device 116 coupled with bus 104 for communicating user input information and command selections to processor 106A or processors 106A, 106B, and 106C. In one embodiment, system 200 also includes a display device 118 coupled with bus 104 for displaying information.

Referring still to FIG. 2, display device 118 of FIG. 2 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. System 200 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a UI 130 under the direction of a processor (e.g., processor 106A or processors 106A, 106B, and 106C). UI 130 allows user to interact with system 100 through graphical representations presented on display device 118 by interacting with alphanumeric input device 114 and/or cursor control device 116.

System 200 also includes an I/O device 120 for coupling system 200 with external entities. For example, in one embodiment, I/O device 120 is a modem for enabling wired or wireless communications between system 200 and an external network such as, but not limited to, the Internet.

Referring still to FIG. 2, various other components are depicted for system 200. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations within RAM 108, computer-readable storage media within data storage unit 112, peripheral computer-readable storage media 102, and/or other tangible computer-readable storage media.

Bus

Figure 3:
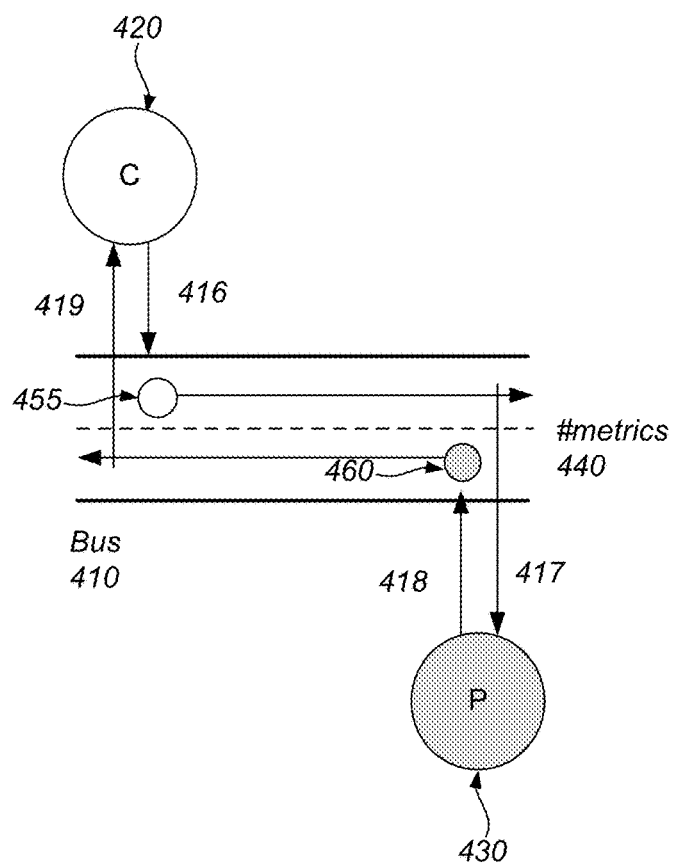
FIG. 3 illustrates a peer system having an asynchronous channel based bus architecture enabling decoupled services, in accordance with various embodiments.

FIG. 3 illustrates a peer system having an asynchronous channel based bus architecture enabling decoupled services in accordance with an embodiment. Although a simplified two peer system 300 is shown, it is exemplary. The system of FIG. 3 may have any number of peers and channels.

FIG. 3 includes a bus 410, a consumer 420, a producer (or peer) 430, a bus channel 440, request 455 and response 460. The use of bus 410 offers architectures a simple, yet elegant way to share information between publishers and subscribers across a local or distributed system. Bus 410 creates a system of consumer(s) 420 and producer(s) 430. The asynchronous nature of bus 410 is ideal for UI's, as well as microservices.

In one embodiment, bus 410 creates a peer to peer (P2P) architecture between all components, thereby removing the need to keep adding hops to a call stack and increasing blocked calls. Bus 410 allows each message to be performed in small asynchronous units of work, that clears the call stack and lets another actor process or send a message, or the UI to re-render a component. Bus 410 essentially allows every message to be processed as a cycle of the event loop (a core part of a browser) or the main application thread instead of being a blocked call in a chain.

The channel based bus 410 that provides two core services. The first is to allow the dynamic creation and subsequent destruction of channel(s) 440 within bus 410. The second is to allow any actor (e.g., consumer(s) 420 and/or producer(s) 430) to publish and/or subscribe to those channel(s) 440 and broadcast messages. Operation is analogous with a chat system like Slack or IRC. A channel 440 can be requested by any actor to which bus 410 is visible, if the channel 440 doesn't exist, it is created. In one embodiment, when there are no more subscribers to a channel 440, the channel 440 is destroyed. Bus 410 allows actors which mainly consist of services and controllers, to send and receive messages 455 and 460 between each other. These messages 455 and 460 can be any type of data such as objects, strings, arrays, streams, collections, or maps.

As stated herein, actors can be considered consumer(s) 420, producer(s) 430, or both. Consumer(s) 420 can issue requests 416 and listen for responses 419, producer(s) 430 can listen for requests 417 and issue responses 418, As long as an actor can see bus 410, they are able to communicate with any other actor within the local or remote system.

In one embodiment, a consumer(s) 420 (or something that needs data) can make a request for data by sending an outbound request message 455 to the topic channel 440 on bus 410. Request message 455 will be broadcast to any subscribed actors listening to request messages on that same channel 440. In this example, # metrics is used as the topic channel(s) 440.

A producer(s) 430 provides data and listens for outbound requests on its topic channel 440. Once the producer(s) 430 receives the request message 455, it can perform whatever operations it requires. When the producer(s) 430 is ready, it sends an inbound response message 460 to the topic channel 440 on bus 410. The consumer(s) 420 is subscribed to # metrics channel 440 also, but is only listening to inbound response messages 460. The consumer(s) 420 will pick up the broadcast message and be able to continue on.

In one embodiment, all of bus 410 activity is handled in a non-blocking and asynchronous manner. In one embodiment, bus 410 makes use of a ReactiveX framework as the foundation. This facilitates the asynchronous/stream based communication. In so doing, bus 410 enables true decoupling of components and services inside applications. Bus 410 becomes the only dependency and is also context neutral. In other words, bus 410 is unaware of the application(s) it's embedded in.

For example, consumer(s) 420 should be able to hop into a channel 440, send a request on the channel. Meanwhile, producer(s) 430 that can meet the request is also listening on the channel. The producer(s) 430 receives the request 455 and then provides the request response 460 on the channel. Consumer 420 will receive the request response 460 on the channel.

Thus, in one embodiment, any component on the bus 410 can talk to each other. They can talk on private channels or on public channels.

For example, a REST service (e.g., producer 430) listens to messages on a REST channel designed for components (e.g., consumer 420) that want to send out a REST response to an API. A component will say on a REST channel, I want to make a call, go get me some VMs or go get me some users. The component (e.g., consumer 420) that sends the request will then go back to idle. The REST service (e.g., producer 430) will take the message and make the XHR/HTTP call needed to go get the data; once the data is returned to the REST service, the REST service will take the returned data and put the data on the message bus on the REST channel. The component that made the call will note the returned data on the REST channel.

In so doing, the component that made the call does not need to know about the REST service, HTTP or the API. Doesn't need to know where the data comes from, how it is processed, or who gets it. It merely needs to listen for responses on the channel. In other words, services, controllers and views have all been decoupled. Instead of communicating with each other through dependency injection or the like, they communicate through message channels on the bus 410. The messaging is all asynchronous so there is no sitting and waiting, only when something else comes down the channel will the application wake up and start handling it.

In one embodiment, the component can send the request on a first channel (e.g., a public channel) and further request that the response be sent on a second separate channel (e.g., a private channel).

In one embodiment, there is no global list of channels, no whitelist of channels or the like received by the components coupled with bus 410. It is a multi-cast communication channel that can be created on demand by a consumer 420 or producer 430. If no one is listening on the channel then nothing will be sent and the messages are dropped from the bus.

In another embodiment, a request to bus 410 can be made by a consumer 420 and/or producer 430 to provide the different channels available on the bus. In another embodiment, there may be a registration, a list of pre-defined channels, etc.

Bridge

Figure 4:
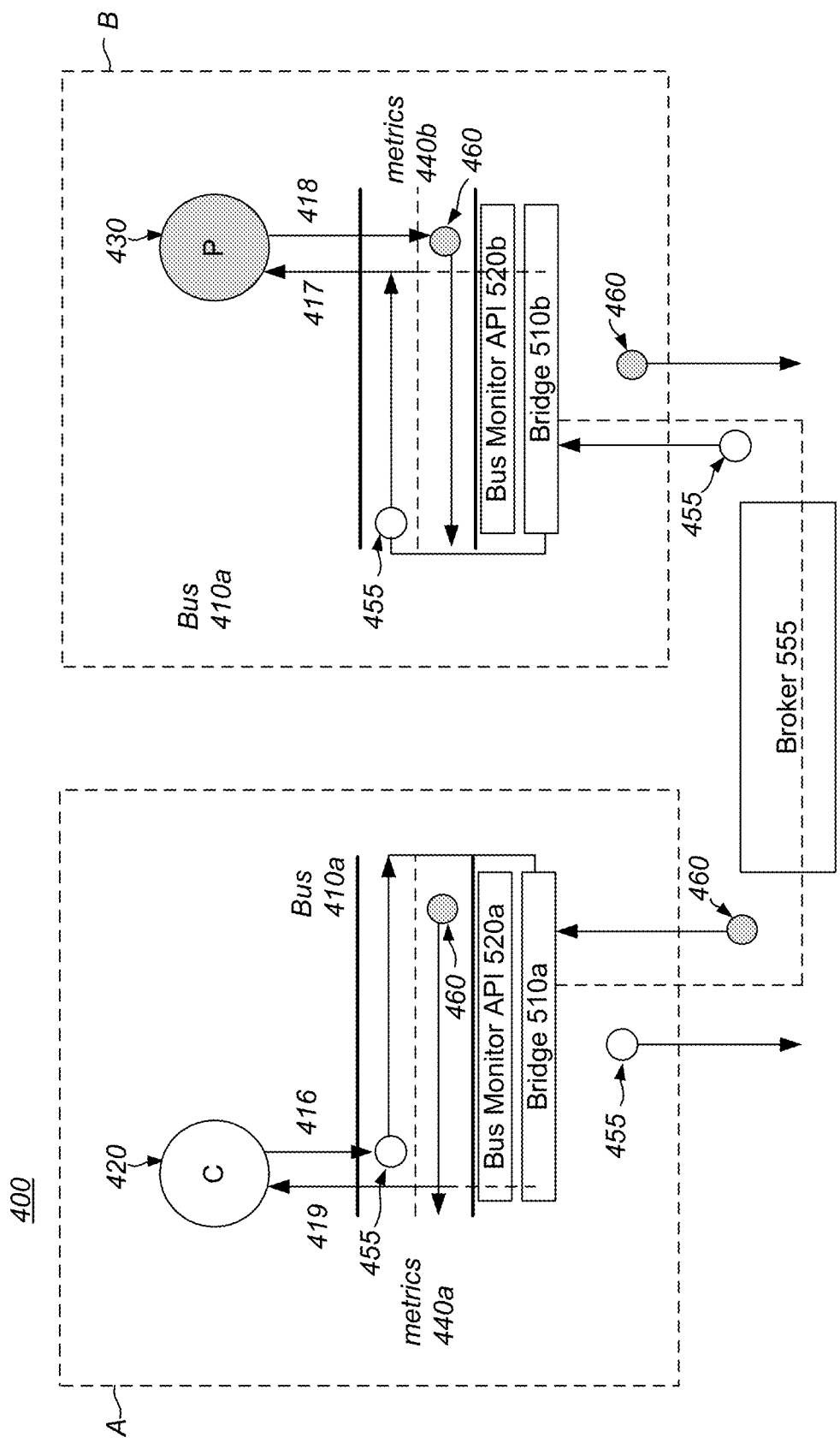
FIG. 4 illustrates the architecture for a bridge transparently extending a bus between two applications, in accordance with various embodiments.

FIG. 4 illustrates the architecture 400 for a bridge 510 (a and b referred to in the following description as bridge 510 unless otherwise noted) transparently extending bus 410 between two applications (e.g., application A and application B). In one embodiment, bridge 510 is a completely decoupled module that depends only on bus 410 (a and b referred to in the following description as bus 410 unless otherwise noted). The function of bridge 510 is to extend specific channel(s) 440 on bus 410 out to an application's message broker 555 (broker 555 may be a broker, platform, designated microservice or the like). In general, these extended channel(s) 440 are referred to herein as Galactic channels.

In one embodiment, bridge 510 operates by making use of a monitor API 520 that bus 410 provides. Monitor API 520 broadcasts channel 440 events relating to creation, subscription, un-subscription and destruction. Events relating to Galactic channels are what bridge 510 really cares about. In one embodiment, bridge 510 ignores all non-Galactic events. In one embodiment, to identify # local vs Galactic or extended channel(s) 440, the following hash convention plus snakecase is used: # local-channel vs Galactic-channel (no hash). However, it should be appreciated that there are no specific limitations on the naming of local vs Galactic channels, the previous convention is merely one of a number of different possible ways to delineate the difference between the local and Galactic channel.

Figure 5:
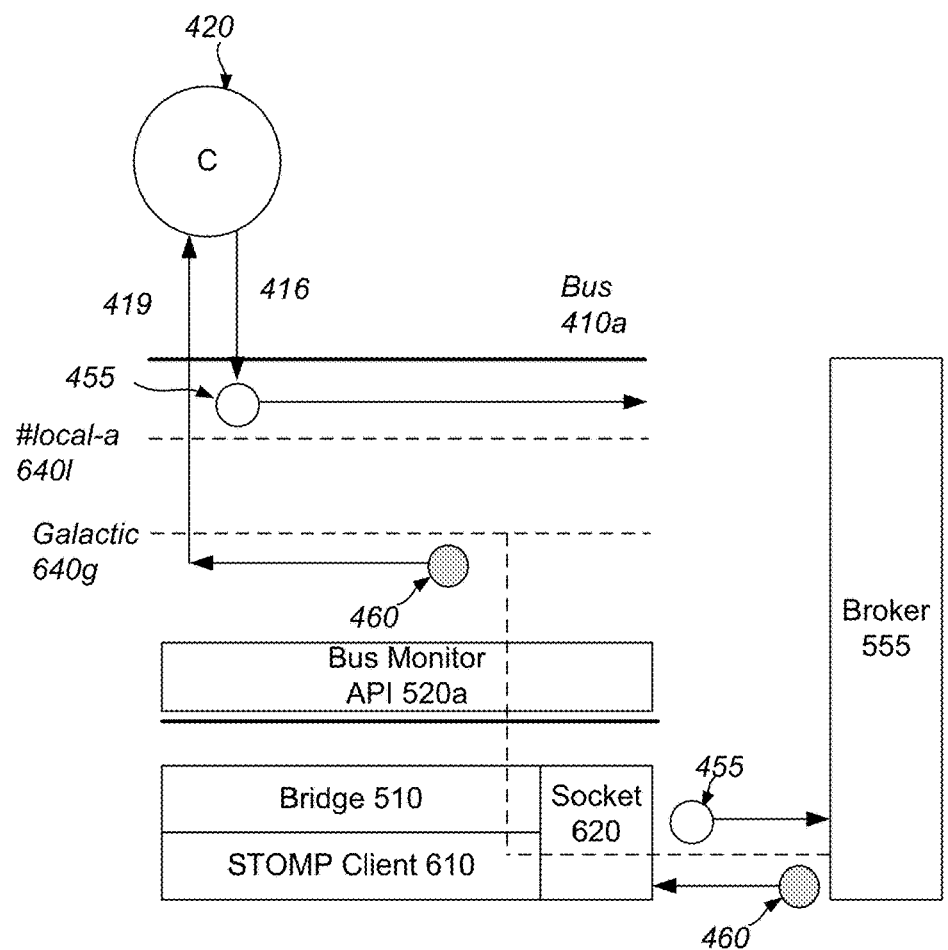
FIG. 5 illustrates the architecture for a bridge transparently extending a bus to and from the message broker, in accordance with various embodiments.

FIG. 5 illustrates the architecture 500 for a bridge 510 transparently extending a bus to and from the message broker. One embodiment illustrates how bridge 510 transparently subscribes to Galactic channel 640g and then proxies request message(s) 455 and response message(s) 460 to and from the message broker 555. It achieves this by listening for Galactic channel 640g traffic, converting request message 455 and response message 460 to and from STOMP client 610 and then sending and receiving messages 455 and 460 over a Socket 620. It further ignores local channel 640l traffic.

In one embodiment, socket 620 is a WebSocket. In general, when a live feed/stream is needed, a browser (or platform) can use sockets (e.g., WebSockets or regular sockets) to create a bidirectional string (it is normally unidirectional). Live feed via the socket 620 is used to send live feed updates (metric, notification, alert, network change, etc.) to the UI and for the UI be able to capture the live feed updates.

When bridge 510 receives a Galactic channel 640g event, it will act as a global broker for that channel and extend the channel out to message broker 555, another service that supports STOMP, or the like. In one embodiment, bus 410 has no knowledge that bridge 510 is operating, neither do the peers (e.g., producer(s) 430 and consumer(s) 420) sending requests and responses. Bridge 510 handles all of the proxying of messages transparently. In other words, bridge 510 acts as the glue between bus 410 and multiple STOMP enabled message broker(s) 555, connected over WebSocket 620.

In one embodiment, bridge 510 has benefits that hide and abstract a lot of complexity. For example, bridge 510 transparently handles all of the WebSocket 620 and session management across multiple message broker(s) 555. In one embodiment, bridge 510 reads raw STOMP frames being sent from message broker 555 and then parses and distributes the messages to the Galactic channel(s) 640g that match the destination of the message. In order to maintain the Galactic channel organization, bridge 510 subscribes to a topic or queue that matches the name of the Galactic channel 640g on bus 410. Once subscribed, bridge 510 will relay any messages 455 and 460 sent to or from any Galactic channel 640g and the mapped topics/queues.

In one embodiment, bridge 510 handles message broker 555 communications via an interoperable wire format such as STOMP 1.2. That is, messages 455 and 460 sent on Galactic channel(s) 640g are marshalled and unmarshalled into STOMP commands that are both transmitted and received by message broker 555. In one embodiment, bus 410 is not aware of STOMP commands; instead, bridge 510 takes care of it all.

For example, when data is desired (e.g., metrics, Virtual machines, user data, etc.), the component can subscribe to all the channels locally, bridge 510 will extend the channels to their own topics on the message broker 555, and, in one embodiment, all through a single socket 620. That is, in one embodiment, every subscribed channel by the component is passed through the single socket 620.

The bridge will receive the response messages from the message broker and then provide the response messages to the local channel related to the initial request. Thus, bridge 510 allows multiple systems to talk to each other without knowing they are talking to remote systems. They think they are talking to a local message bus but they are actually extended to any number of systems.

For example, they are sending things on local channels 640l or Galactic channels 640g, if it is sent on a Galactic channel 640g, the monitor API 520 realizes it is a message 455 on a Galactic channel 640g, takes the message 455 to bridge 510 through the STOMP client 610 and over the WebSocket 620 and transports it to the broker 555 and anyone listening. A listening component coupled with the broker/platform 555 will receive the message 455 and send a response 460 back to the WebSocket 620, through the STOMP client 610 up to the bridge 510 and the bridge 510 will put the response 460 on the proper channel 640g.

In one embodiment, bus 410 and bridge 510 don't require any additional technologies other than the language they are written in and the ReactiveX framework to operate. An existing application message broker 555 (like Spring) could instantly be adapted to communicate over STOMP. In one embodiment, bus 410 and bridge 510 inside the Bifröst is written in TypeScript and Java and depends on reactive extensions for JavaScript (RxJS) and Java (RxJava). In general, the STOMP implementation does not require any third party libraries as it is custom built, such as by using the STOMP 1.2 specification.

In other words, using bridge 510, the service will send the information on the channel, the bridge will be able to translate the information (via the STOMP) before it is put on the broker/platform and translate the response before it is put back on the channel to the service. In so doing, each different service can universally communicate. Thereby providing a real-time distributed architecture where producers and consumers can talk to each other asynchronously by any number of remote systems and local systems. Thus, using Bifröst, the concept of local and remote no longer matters; resulting in scalability, distribution, extension, speed, performance, etc.

That is, bridge 510 allows the application to connect to multiple message broker(s) 555 at the same time and create and consume multiple streams of data that can be bound together to create new streams. Message broker(s) 555 can be distributed/relayed and expand Galactic channels 640g out across clouds and DMZ's. Moreover, messages 455 and 460 can be relayed between message broker(s) 555 to connect services and UI's across different networks, all transparently.

In general, broker 555 can be a single broker or a pool of brokers. Messages are stateless. Further, in one embodiment, the message(s) are queued by the broker so that the component will not miss a message if it is down/away/occupied, etc. In one embodiment, bridge 510 has a socket watchdog that will reconnect if there is an error or disconnect between bridge 510 and message broker 555.

Decoupled System Communication

Figure 6:
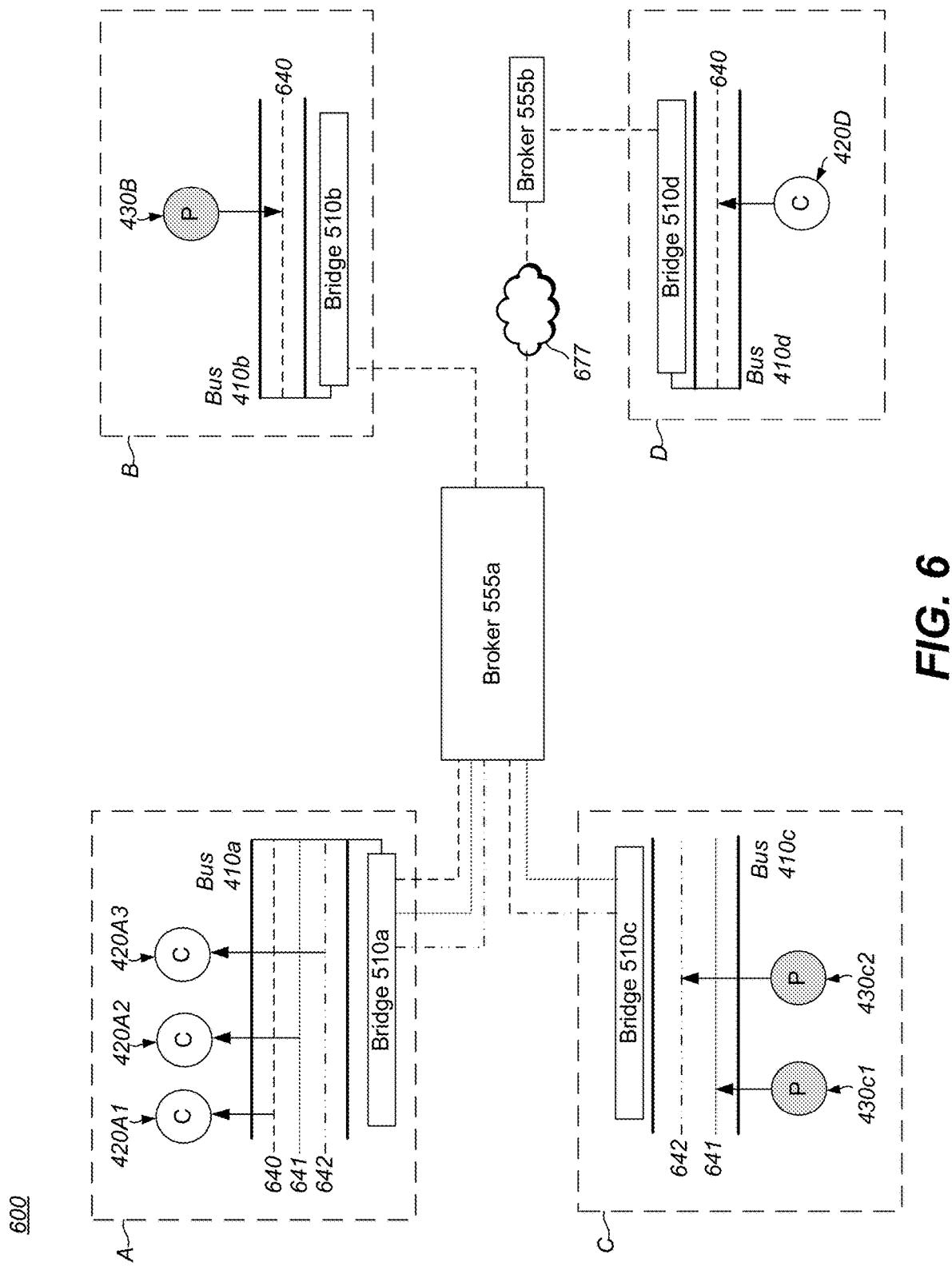
FIG. 6 illustrates the architecture of a plurality of different applications all communicating via the distributed buses, in accordance with various embodiments.

FIG. 6 illustrates the architecture 600 of a plurality of different applications all communicating via the distributed buses. In one embodiment, four different applications (A-D) are communicating via the distributed buses 410a-410d, two applications (A and D) are producing content, another two (B and C) are consuming. In one embodiment, application D is connected to the distributed bus 410 via a relay 677.

The buses 410a-410d in combination with the bridges 510a-510d, provide the mechanisms to handle multiple streams of data inside an application (via channel(s) 640-642 on the different buses) and also provides the ability to distribute and manage these streams across applications. For example, bus 410a has three Galactic channels 640-642, bridge 510a (and the components as shown in detail in FIG. 5) provides the content to bridges 510b-510d via broker 555a and broker 555b via relay 677. As shown in FIG. 6, channel 640 has consumer 420A1 in Application A, consumer 420D in Application D, and producer 430B in Application B able to provide and receive messages thereon via the monitoring provided by bridge 510a, bridge 510b and bridge 510c respectively.

Channel 641 has consumer 420A2 in Application A and producer 430c1 in Application C able to provide and receive messages thereon via the monitoring provided by bridge 510a and bridge 510c respectively.

Channel 642 has consumer 420A3 in Application A and producer 430c2 in Application C able to provide and receive messages thereon via the monitoring provided by bridge 510a and bridge 510c respectively.

Thus, when the dependencies between services, controllers and views are reduced down to a single entity, a developer is no longer required to create mocks for previously injected services. Unit tests can truly focus on just testing the logic of the class or component. Previously, any component that had a high number of service dependencies would normally require a mock for those services when running unit tests. When using bus 410, these mocks are no longer required. Writing tests with full coverage becomes a much simpler and less time consuming task.

In other words, each component becomes decoupled from one another. They are no longer calling each other via public API's that they expose. By simply hooking into the Bus and listening for requests on specific channels, the component can avoid having to worry about changing API signatures of its peers, or having to register with one another. The Bus allows multiple components to be composed into modules, with the possibility of being lazily loaded in and out of an application on demand.

An application can load in a module that provides a required service, once the module is loaded, all the modules components initialize and start to join channels on bus 410, ready to engage. Any component inside the parent application that needs a service from the newly loaded module can just start sending requests. The loaded module will respond accordingly. This benefit allows the design of modular applications, composed out of decoupled modules that act as microservices.

Since service call chaining no longer exists, all operations can happen asynchronously which provides a huge performance improvement over blocking chained calls. Moreover, it also allows developers to build new architectures that focus on a stream and event based/reactive world. Further, it facilitates designers to construct new experiences based on stream driven data, particularly if the data is live streaming via bridge 510.

In one embodiment, services can make requests and handle responses with just a few lines of code. For example, request message(s) 455 and response message(s) 460 can be handled with class methods, or closures. E.g.:

```
const bus = new MessagebusService( );
/* will log 'response: echo [hello!]' */
bus.respondOnce("#local-channel").generate(
    (request: string) => {
        return "echo [" + request + "]";
    }
);
bus.requestOnce("#local-channel", "hello!").handle(
    (response: string) => {
        console.log("response: " + echo);
    }
);
```

In one embodiment, bus(es) 410(a-d) creates a peer-to-peer architecture between all components and removes the need to keep adding hops to a call stack and increasing blocked calls. Bus 410 allows each message to be performed in small asynchronous units of work, that clears the call stack and lets another actor process or send a message, or the UI to re-render a component. In other words, bus 410 essentially allows every message to be processed as a cycle of the Event Loop (core component of the browser) or as a single cycle on the main application thread instead of being a blocked call in a chain.

In one embodiment, bridge(s) 510(*a-d*) allows components using bus 410 to treat distributed (Galactic) channels as regular channel(s) 440. Moreover, the process of how those messages are broadcast to remote consumers is completely abstracted away from the developer. That is, there is no requirement to learn the complexities of WebSocket 620 communications, STOMP, or handling multiple streams with data arriving asynchronously.

In other words, individual components inside an application or service can communicate directly with other services or components locally or remotely via bridge 510. In one embodiment, no other component needs to know about the conversations happening between other services, components, message broker(s) 555, or headless microservices. This allows a selection menu in a UI (or other application) to request data over a Galactic channel 640g from a microservice running somewhere. Only the dropdown component and the microservice would know about the conversation and the rest of the application could remain idle.

The Bifröst architecture allows a browser based UI, a non-browser based application, or a microservice to talk directly to a message broker 555 over socket 620. It further allows any other non-browser based application or microservice to communicate with a message broker 555 using standard sockets and the same protocol to send and receive messages is used.

The ability to directly connect to the broker means the need for middleware goes away. A UI, or other application, no longer needs a monolithic platform to serve its data needs, or connect to the broker and proxy messages on its behalf. The Bridge allows the application to connect to multiple message brokers at the same time and create and consume multiple streams of data that can be bound together to create new streams. Moreover, message brokers can be distributed/relayed and expand Galactic channels out across clouds and DMZ's. Messages can be relayed between brokers to connect services and UI's across different networks, all transparently.

In other words, The Bifröst provides the mechanisms to handle multiple streams of data inside an application (via channels on the bus) and also provides the ability to distribute and manage these streams across applications. In so doing, architects can now design systems without the concern of distributed control planes or worrying about integrations and API's. User experience designers can imagine UI's and workflows composed from multiple streams of data from different applications and microservices. Dashboards can now source information from as many services as can be supported. The Bifröst allows designers and developers to create single UI's for applications that consume data across multiple products or even across entire networks.

With a distributed Galactic bus, applications only need to worry about two things, which channel(s) 640-642 to ask for and receive the data. The data could be supplied by another application connected to the same broker on the same Galactic channel or on a different broker connected to the same Galactic channel. Thus, bus 410 and bridge 510 that make up the Bifröst allows for applications to be modularly constructed, decoupled, asynchronous and lazily loaded.

Example Methods of Operation

Figure 7:
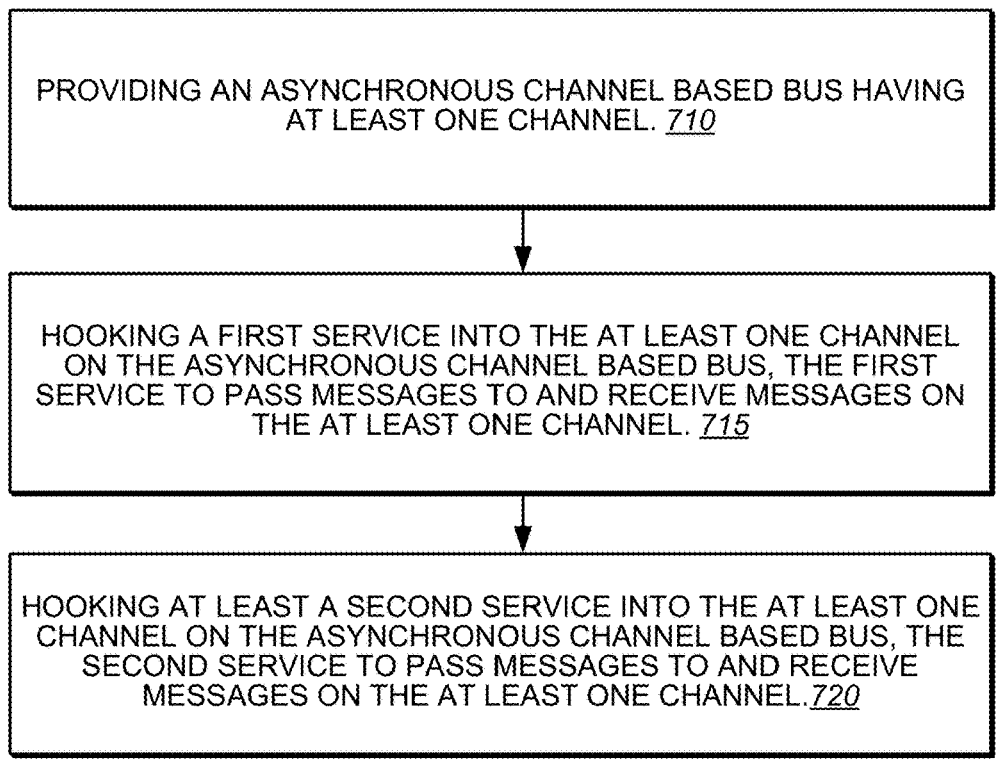
FIG. 7 illustrates a flow diagram of a method for using an asynchronous channel based bus architecture to enable decoupled services, according to various embodiments.

FIG. 7 illustrates a flow diagram 700 of an example method for using an asynchronous channel based bus architecture to enable decoupled services, according to various embodiments. Procedures of the method will be described with reference to elements and/or components of FIGS. 4-6. It is appreciated that in some embodiments, the procedures may be performed in a different order than described, that some of the described procedures may not be performed, and/or that one or more additional procedures to those described may be performed. Flow diagram 700 includes some procedures that, in various embodiments, are carried out by one or more processors under the control of computer-readable and computer-executable instructions that are stored on non-transitory computer-readable storage media. It is further appreciated that one or more procedures described in flow diagram 700 may be implemented in hardware, or a combination of hardware with firmware and/or software.

With reference to 710 of flow diagram 700 and to FIGS. 3-6, one embodiment providing an asynchronous channel based bus 410 having at least one channel 440. In one embodiment, a dynamic creation of a plurality of channels within bus 410 is allowed. Further, a subsequent destruction of one or more of the plurality of channels within bus 410 is also allowed.

Referring now to 715 of flow diagram 700 and to FIGS. 3-6, one embodiment hooks a first service 420 into the at least one channel 440 on the asynchronous channel based bus 410, the first service 440 to pass messages 455 to 416 and receive 419 messages 460 on the at least one channel 440.

Referring now to 720 of flow diagram 700 and to FIGS. 3-6, one embodiment hooks a second service 430 into the at least one channel 440 on the asynchronous channel based bus 410, the second service 430 to receive 417 messages 455 on and pass messages 460 to 418 the at least one channel 440.

One embodiment allows a service (e.g., consumer(s) 420 and/or producer(s) 430) to publish to, and receive from, any of the plurality of channels of bus 410 and additionally allows a controller (e.g., consumer(s) 420 and/or producer(s) 430) to publish to, and receive from, any of the plurality of channels of bus 410.

In one embodiment, prior to hooking into the at least one channel 440, the first service 420 and the second service 430 do not have to change API signatures. In one embodiment, prior to hooking into the at least one channel 440, the first service 420 and the second service 430 do not have to register with one another.

In one embodiment, each message 455 from the first service 420 and each message 460 from the second service 430 is provided on the bus asynchronously, such that no call chaining exists between the first service 420 and the second service 430.

One embodiment, communicatively couples a bridge 510 to the at least one Galactic channel (e.g., one of 640-642) of the asynchronous channel based bus 410 and distributes, via the bridge, at least one message on the at least one Galactic channel (e.g., one of 640-642) to a different Galactic channel (e.g., another of 640-642).

One embodiment receives, at bridge 510, every message (e.g., message 455) sent on the at least one Galactic channel 640g. For example, bridge 510 will monitor the broadcast of the monitor API 520 for every Galactic channel event on bus 410. In one embodiment, bridge 510 will ignore the broadcast of the monitor API 520 with respect to local channel events (e.g., local channel 640*l*).

In one embodiment, bridge 510 will monitor every Galactic channel on bus 410 and receive every message sent on every Galactic channel of bus 410.

One embodiment converts, via a message translator (e.g., STOMP client 610) coupled with bridge 510, every message 455 sent on the at least one Galactic channel 640*g* from a channel message format used by the at least one Galactic channel 640*g* into a common message format.

In one embodiment, bridge 510 will convert, via the message translator (e.g., STOMP client 610) coupled with bridge 510, every message received from every Galactic channel 640*g* from the message format used by each Galactic channel of bus 410 to a common message format.

In one embodiment, bridge 510 simultaneously distributes the least one message on the at least one Galactic channel 640*g* to a plurality of message brokers (e.g., 555*a*, 555*b*, etc.).

In one embodiment, the plurality of message brokers (e.g., 555*a*, 555*b*, etc.) redistribute the at least one message 455 to a plurality of bridges (e.g., 510*a*, 510*b*, 510*c*, 510*d*, etc.), each of the plurality of bridges (e.g., 510*a*, 510*b*, 510*c*, 510*d*, etc.) coupled to a different asynchronous channel based bus (e.g., 410*a*, 410*b*, 410*c*, 410*d*, etc.), each different asynchronous channel based bus (e.g., 410*a*, 410*b*, 410*c*, 410*d*, etc.) having at least one Galactic channel (e.g., 640, 641, 642, etc.) thereon.

Thus, the ability to directly connect to the broker means the need for middleware goes away. A UI, or other application, no longer needs a monolithic platform to serve its data needs, or connect to the broker and proxy messages on its behalf. The Bridge (e.g., 510*a*, 510*b*, 510*c*, 510*d*, etc.) allows the application to connect to multiple message brokers (e.g., 555*a*, 555*b*, etc.) at the same time and create and consume multiple streams of data that can be bound together to create new streams. Moreover, message brokers (e.g., 555*a*, 555*b*, etc.) can be distributed/relayed and expand Galactic channels e.g., 640, 641, 642, etc.) out across clouds 677 and DMZ's. Messages can be relayed between brokers (e.g., 555*a*, 555*b*, etc.) to connect services and UI's (e.g., 420A1-A3, 430B, 430*c*1-*c*2, 420D, etc.) across different networks (e.g., A, B, C, D, etc.), all transparently.

In other words, The Bifröst provides the mechanisms to handle multiple streams of data inside an application (via channels on the bus) and also provides the ability to distribute and manage these streams across applications.

CONCLUSION

The Bifröst provides a solution to the single pane of glass UI problem. Embodiments provide a mental shift for developers over to stream/reactive based programming a lot easier. It facilitates more rapid development of complex reactive style experiences without the investment required to understand the lower level intricacies.

The Bifröst provides a turbocharger for UI and service architectures in software as a service (SaaS) based world that demands applications and services operate in a distributed manner.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A system comprising:
   an asynchronous channel based bus having at least one channel;
   a first service hooked to the at least one channel without being registered with a second service, the first service to pass messages to and receive messages on the at least one channel; and
   the second service hooked to the at least one channel without being registered with the first service, the second service to pass messages to and receive messages on the at least one channel,
   wherein the at least one channel is configured as a Galactic channel, and
   wherein messages received from the at least one Galactic channel are converted from a channel message format used by the at least one Galactic channel to a common message format.

2. The system of claim 1, wherein the asynchronous channel based bus allows a dynamic creation of a plurality of channels.

3. The system of claim 2, wherein the asynchronous channel based bus allows a dynamic destruction of any of the plurality of channels.

4. The system of claim 2, wherein the asynchronous channel based bus allows any actor to subscribe to any of a plurality of channels on the bus.

5. The system of claim 1, wherein the first service is not coupled with the second service.

6. The system of claim 1, wherein a dependency between the first service and the second service is a single entity.

7. The system of claim 1, wherein the asynchronous channel based bus allows each message to be performed in small asynchronous units of work, such that a call stack for each of the first service and the second service is cleared and each of the first service and the second service can process or send another message.

8. The system of claim 1, wherein the first service and the second service do not have to change API signatures before they hook into the at least one channel.

9. The system of claim 1, wherein each message provided by the first service on the bus is provided asynchronously and each message provided by the second service on the bus is provided asynchronously, such that no call chaining exists between the first service and the second service.

10. The system of claim 1, further comprising:
    an nth service coupled to the asynchronous channel based bus,
    the nth service to pass messages to and receive messages on the at least one channel, and the nth service composed into a module with the first service to form a first microservice.

11. The system of claim 10, wherein each message, on the bus, provided by the first service, the second service, and the nth service is provided asynchronously such that no call chaining exists between any of the first service, the second service and the nth service.

12. A computer-implemented method for using an asynchronous channel based bus architecture to enable decoupled services, the computer-implemented method comprising:
providing an asynchronous channel based bus having at least one channel;
hooking a first service into the at least one channel without registering the first service with a second service, the first service to pass messages to and receive messages on the at least one channel; and
hooking the second service into the at least one channel without registering the second service with the first service, the second service to pass messages to and receive messages on the at least one channel,
wherein the at least one channel is configured as a Galactic channel, and
wherein messages received from the at least one Galactic channel are converted from a channel message format used by the at least one Galactic channel to a common message format.

13. The computer-implemented method of claim 12, wherein
prior to hooking into the at least one channel, the first service and the second service do not have to change respective API signatures.

14. The computer-implemented method of claim 12, further comprising:
allowing a dynamic creation of a plurality of channels within the asynchronous channel based bus; and
allowing a subsequent destruction of one or more of the plurality of channels within the asynchronous channel based bus.

15. The computer-implemented method of claim 12, further comprising allowing the first service and the second service to publish to, and receive from, any of the plurality of channels of the asynchronous channel based bus.

16. The computer-implemented method of claim 12, further comprising:
providing each message from the first service on the bus asynchronously; and
providing each message from the second service on the bus asynchronously, such that no call chaining exists between the first service and the second service.

17. A computer-implemented method for using an asynchronous channel based bus architecture to enable decoupled services, the computer-implemented method comprising:
providing an asynchronous channel based bus having at least one Galactic channel;
hooking a first service into the at least one Galactic channel on the asynchronous channel based bus, the first service to pass messages to and receive messages on the at least one Galactic channel;
hooking at least a second service into the at least one Galactic channel on the asynchronous channel based bus, the second service to pass messages to and receive messages on the at least one Galactic channel;
communicatively coupling a bridge to the at least one Galactic channel of the asynchronous channel based bus;
distributing, via the bridge, at least one message on the at least one Galactic channel to a different Galactic channel;
simultaneously distributing, via the bridge, at least one message on the at least one Galactic channel to a plurality of message brokers; and
redistributing, by the plurality of message brokers, the at least one message to a plurality of bridges, each of the plurality of bridges coupled to a different asynchronous channel based bus, each different asynchronous channel based bus having at least one Galactic channel thereon.

18. The computer-implemented method of claim 17, further comprising: converting, via a message translator coupled with the bridge, every message received from the at least one galactic channel from a channel message format used by the at least one galactic channel to a common message format.

* * * * *